(12) United States Patent
Drolet et al.

(10) Patent No.: US 10,859,096 B2
(45) Date of Patent: Dec. 8, 2020

(54) DIFFUSER WITH NON-UNIFORM THROAT AREAS

(71) Applicant: PRATT & WHITNEY CANADA CORP., Longueuil (CA)

(72) Inventors: Martin Drolet, Saint-Amable (CA); Jason Nichols, Mississauga (CA)

(73) Assignee: PRATT & WHITNEY CANADA CORP., Longueuil (CA)

(*) Notice: Subject to any disclaimer, the term of this patent is extended or adjusted under 35 U.S.C. 154(b) by 107 days.

(21) Appl. No.: 16/175,986

(22) Filed: Oct. 31, 2018

(65) Prior Publication Data

US 2020/0132086 A1 Apr. 30, 2020

(51) Int. Cl.
*F04D 29/44* (2006.01)
*F01D 9/06* (2006.01)

(52) U.S. Cl.
CPC ............. *F04D 29/441* (2013.01); *F01D 9/06* (2013.01); *F05D 2220/32* (2013.01); *F05D 2240/128* (2013.01); *F05D 2260/60* (2013.01)

(58) Field of Classification Search
CPC ...... F04D 29/441; F01D 9/06; F05D 2220/32; F05D 2240/128; F05D 2260/60
See application file for complete search history.

(56) References Cited

U.S. PATENT DOCUMENTS

| 2,157,002 | A | 5/1939 | Moss |
| 3,006,603 | A | 10/1961 | Caruso et al. |
| 3,706,510 | A | 12/1972 | O'Connor |
| 3,860,360 | A | 1/1975 | Yu |
| 9,541,094 | B2 | 1/2017 | Iwakiri et al. |
| 2017/0114794 | A1* | 4/2017 | Duong ...................... F02C 3/08 |
| 2017/0152861 | A1* | 6/2017 | Japikse .................... F02C 6/12 |

FOREIGN PATENT DOCUMENTS

WO  2015102727  7/2015

* cited by examiner

*Primary Examiner* — Nathaniel E Wiehe
*Assistant Examiner* — Eric A Lange
(74) *Attorney, Agent, or Firm* — Norton Rose Fulbright Canada LLP

(57) ABSTRACT

A compressor diffuser for a gas turbine engine includes a plurality of diffuser passages including a first portion having a radial component, a second portion having an axial component, and a curved portion fluidly connecting the first portion and the second portion. The diffuser passages having a throat located within the first portion thereof, and including a first subset of passages and a second subset of passages. The throats of the first subset of passages have a first throat area that is different than a throat area of the throats of the second subset of passages.

19 Claims, 4 Drawing Sheets

DIFFUSER WITH NON-UNIFORM THROAT AREAS

TECHNICAL FIELD

The application relates generally to centrifugal compressors of gas turbine engines and, more particularly, to the diffusers of such centrifugal compressors.

BACKGROUND

Centrifugal compressors employed in gas turbine engines include generally a rotating impeller and a diffuser downstream of the impeller for diffusing the high speed air and thus transform the kinetic energy of the flow into pressure. Such diffusers include diffuser passages, which direct the flow of compressed air from the impeller of the centrifugal compressor to an annular chamber containing the combustor, while diffusing the high speed air. These diffuser passages are circumferentially arranged around a periphery of the impeller, and accordingly form a circumferential array of diffuser passages. Such diffusers may include pipe diffusers or vane diffusers.

The diffuser passages in each diffuser passage array are all identical to one another. Each diffuser passage therefore defines a throat region that has a constant geometry (e.g. constant shape and diameter) relative to the other diffuser pipes in the circumferential array. The geometric properties are therefore the same for all of the circumferentially distributed diffuser pipes, and therefore the diffuser passages defined therein, in the circumferential array of diffuser pipes of the diffuser of the centrifugal compressor. Thus, all of the diffuser passages in a typical centrifugal compressor diffuser assembly have the same throat area.

SUMMARY

There is accordingly provided a compressor diffuser for a gas turbine engine comprising: a plurality of diffuser passages circumferentially distributed about a central axis and configured for diffusing a flow of compressed air, the diffuser passages including a first portion having a radial component extending from an inlet, a second portion having an axial component extending to an outlet, and a curved portion fluidly connecting the first portion and the second portion, the first portion defining a throat, the diffuser passages including a first subset of passages and a second subset of passages, the throats of the first subset of passages having a throat area that is different than a throat area of the throats of the second subset of passages.

There is also provided a centrifugal compressor comprising: an impeller rotatable about a central longitudinal axis, the impeller having a radial impeller outlet; and a diffuser deposed downstream of the impeller, the diffuser configured to diffuse gas received from the radial impeller outlet, the diffuser including: a plurality of diffuser passages for diffusing the flow of compressed air received form the impeller, the diffuser passages including a first portion extending away from an inlet of the diffuser passages and defining a throat therein; and wherein the plurality of diffuser passages include at least first and second passages, the throats of the first and second passages having different cross-sectional areas.

There is alternately provided a compressor diffuser for a gas turbine engine comprising: a plurality of diffuser passages circumferentially distributed about a central axis and configured for diffusing a flow of compressed air, the diffuser passages including a first portion having a radial component extending from an inlet, a second portion having an axial component extending to an outlet, and a curved portion fluidly connecting the first portion and the second portion, the first portion defining a throat, the diffuser passages including a first subset of passages and a second subset of passages, the throats of the first subset of passages having a throat area that is different than a throat area of the throats of the second subset of passages.

There is alternately provided a centrifugal compressor comprising: an impeller rotatable about a central longitudinal axis, the impeller having a radial impeller outlet; and a diffuser deposed downstream of the impeller, the diffuser configured to diffuse gas received from the radial impeller outlet, the diffuser including: a plurality of diffuser passages for diffusing the flow of compressed air received form the impeller, the diffuser passages including a first portion extending away from an inlet of the diffuser passages and defining a throat therein; and wherein the plurality of diffuser passages include at least first and second passages, the throats of the first and second passages having different cross-sectional areas.

There is also alternately provided method for diffusing fluid flow in a centrifugal compressor, comprising conveying the fluid flow through a plurality of diverging internal flow passages of a diffuser of the centrifugal compressor, the internal flow passages including an inlet and a throat located downstream of the inlet, wherein the throats of the internal flow passages of the diffuser are non-uniform.

BRIEF DESCRIPTION OF THE DRAWINGS

Reference is now made to the accompanying figures, in which:

FIG. 1 illustrates a gas turbine engine 10 of a type preferably provided for use in subsonic flight, generally comprising in serial flow communication along an engine axis 11: a compressor section 14 for pressurizing the air, a combustor 16 in which the compressed air is mixed with fuel and ignited for generating an annular stream of hot combustion gases, and a turbine section 18 for extracting energy from the combustion gases. The compressor section 14 may include one or more axial compressor stages each having a stator 13 and a rotor 15 (only one axial stage with one stator 13 and one rotor 15 being shown in FIG. 1), and it may also include a centrifugal compressor 19.

Figure 1:
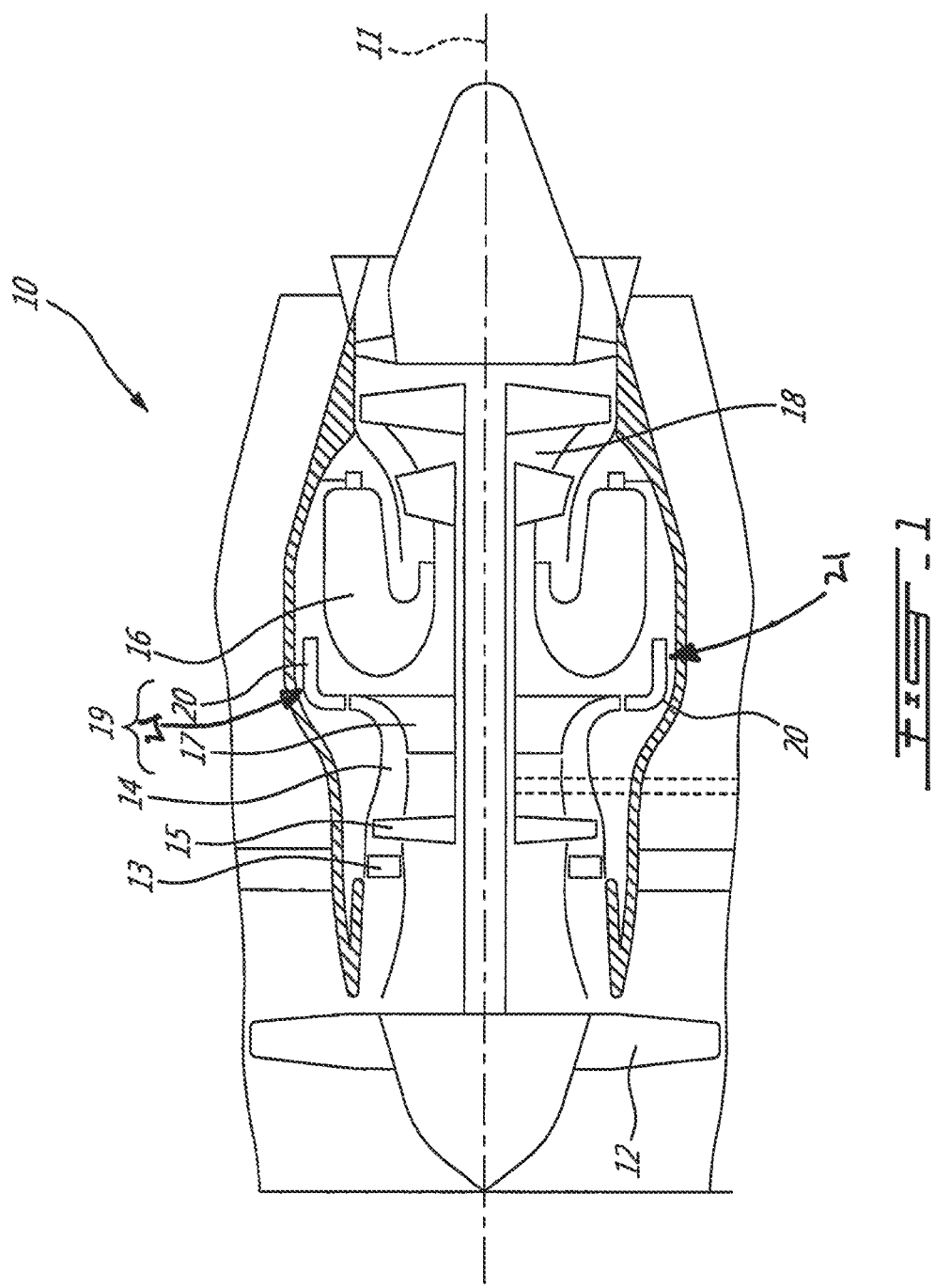
FIG. 1 is a cross-sectional view of a gas turbine engine.

Although the gas turbine engine 10 depicted in FIG. 1 is a turbofan engine, and therefore also includes a fan 12 through which ambient air is propelled before entering a downstream portion of the compressor section 14, it is to be understood that the gas turbine engine as described herein may also be other types of gas turbine engines, including turboprops, turboshafts, auxiliary power units, industrial gas turbines, etc.

The centrifugal compressor 19 of the compressor section 14 of the gas turbine engine 10 includes generally a rotating impeller 17 and a static diffuser 21 located downstream of the impeller 17. The diffuser 21 may be a pipe diffuser, in which case it comprises a plurality of diffuser pipes which are circumferentially disposed about a periphery of the exit of the impeller 17. Alternately, the diffuser 21 may be a vane diffuser, in which case it compresses a plurality of diffuser passages which also extend away from the exit of the impeller 17 about its periphery. While the diffuser will generally be described herein in the context of a pipe diffuser, it is to be understood that the diffuser 21 of the present disclose may also be a vane diffuser, which includes a plurality of diffuser passages much as per the internal passages of the diffuser pipes.

Figure 2:
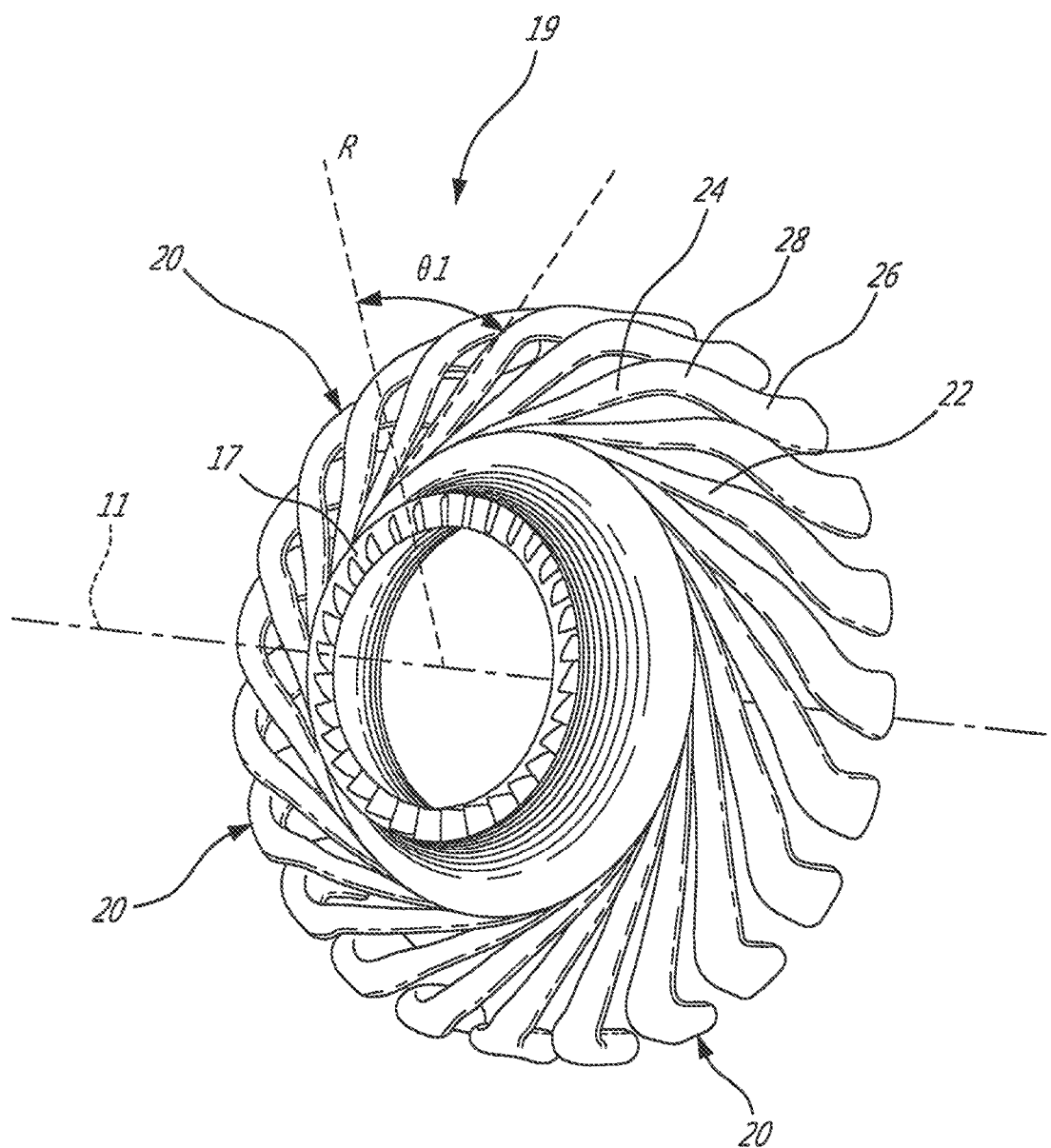
FIG. 2 is a perspective view of a centrifugal compressor of the gas turbine of FIG. 1, the centrifugal compressor having an impeller and a diffuser including plurality of diffuser pipes.
Figure 3:
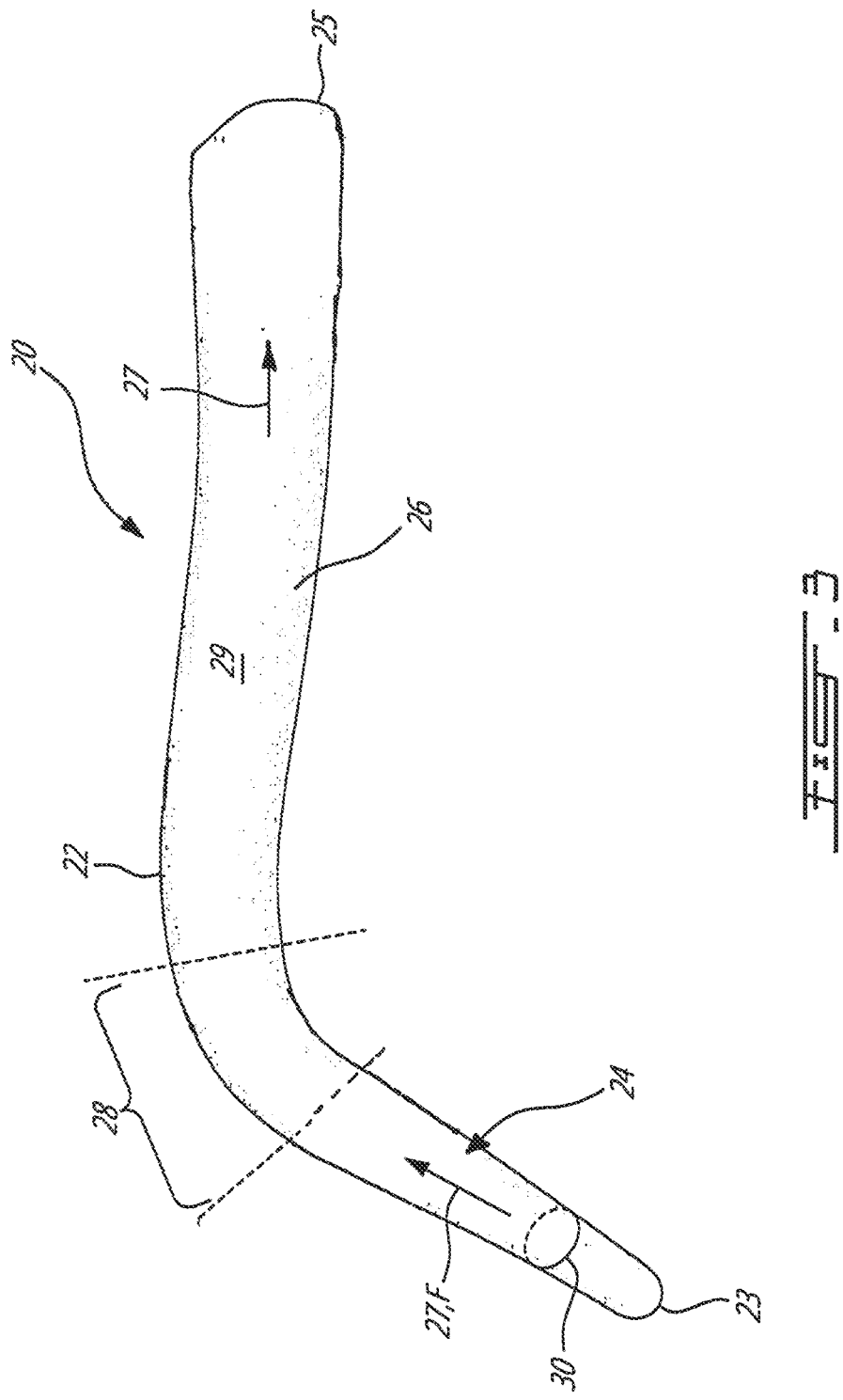
FIG. 3 is a perspective view of one diffuser pipe of the plurality of diffuser pipes of the centrifugal compressor as shown in FIG. 2.

Referring to FIGS. 2 and 3, the centrifugal compressor 19 of the gas turbine engine 10 includes the impeller 17 and a circumferential array of the diffuser pipes 20, also referred to as "fishtail" diffuser pipes, which collectively form the diffuser 21. The diffuser pipes 20 are circumferentially disposed about the periphery of the exit of the impeller 17 to form an array of diffuser pipes, each of which defines an internal diffuser passage which extends at least partially downstream from the impeller. In the depicted embodiment, the diffuser pipes 20 also redirect the air flow from a radial orientation (as it exits the impeller 17) to an axial orientation (i.e. aligned with the engine axis 11, as it exits the diffuser pipes 20).

Each of the diffuser pipes 20 includes a diverging (in a downstream direction) diffuser passage. In the depicted pipe diffuser embodiment, each of these diffuser passages 22 is defined by a tubular body 22 of the diffuser pipes 20. The enclosed tubular body 22 defines an internal diffuser passage 29 (seen in FIG. 3) extending the length of the diffuser pipe 20 and through which the compressed fluid flow is conveyed.

The diffuser pipes 20 convert high kinetic energy from the air at the impeller 17 exit to static pressure by slowing down the air flow exiting the impeller. The Mach number of the fluid flow F through each of the diffuser pipes 20 (see FIG. 3) therefore decreases in the direction 27 of fluid flow F, and is lowest near the outlet 25 of each diffuser pipe 20. In most cases, the Mach number of the flow entering the diffuser pipes 20 may be at or near sonic, while the Mach number exiting the diffuser pipe 20 may be in the sub-sonic range to enable stable air/fuel mixing, and light/re-light in the combustor 16.

As seen in both FIGS. 2 and 3, the diffuser passage 29 of each of the diffuse pipes 20 includes a first portion 24 extending generally tangentially and radially from the periphery of the impeller 17. An open end is provided at a most upstream end of the tubular body 22 and forms an inlet 23 of the diffuser pipe 20. The first portion 24 of the diffuser pipes 20 may be inclined at an angle θ1 relative to a radial axis R. The angle θ1 may be at least partially tangential, or even substantially tangentially, and may further correspond to a direction of the fluid flow at the exit of the blades of the impeller 17, such as to facilitate transition of the flow from the impeller 17 to the diffuser pipes 20. The first portion 24 of the tubular body 22 can alternatively extend more substantially along the radial axis R.

The diffuser passage 29 of the diffuser pipes 20 also includes a second portion 26, which is downstream from the first portion 24. The second portion 26 of the diffuser pipes 20 is disposed generally axially, and is fluidly connected to the first portion 24 by an out-of-plane curved portion 28 or "bend". An open end at a most downstream end of the second portion 26 forms an outlet 25 of the diffuser pipe 20. Preferably, but not necessarily, the first portion 24 and the second portion 26 of the diffuser pipes 20 are integrally formed together and extend substantially uninterrupted between each other, via the curved, bend, portion 28.

Referring still to FIG. 3, diffuser passage 29 of the diffuser pipe 20 diverges in the direction 27 of the fluid flow F therethrough, in that the internal fluid passage 29 increases in cross-sectional area along its length which extends between the inlet 23 and the outlet 25 thereof. This increase in cross-sectional area of the internal fluid passage 29 through each diffuser pipe 20 may be continuous along the complete length of the tubular body 22, or alternately the cross-sectional area of the internal fluid passage 29 may increase in increments (for example, but not necessarily gradual increments) along the length of the tube. In the depicted embodiment, the cross-sectional area of the internal fluid passage 29 defined within the tubular body 22 increases gradually and continuously along its length, from the inlet 23 to the outlet 25.

As seen in FIG. 3, the first portion 24 of each diffuser pipe 20 is an upstream portion of each diffuser pipe 20 which receives the fluid flow F first from the exit of the impeller 17 (see FIG. 2), via the pipe inlet 23. The first portion 24 of the pipe has a smaller cross-sectional area along at least a portion of its length than that of the curved portion (or bend) 28 and the second portion 26 of the pipe downstream therefrom, which enables diffusion of the flow. Each diffuser passage 29 defines therein a throat 30 located at a point between the inlet 23 and the outlet 25 of the diffuser pipe 20. More particularly, however, the throat 30 is located in the first portion 24 of the diffuser pipe 20, downstream of the inlet 23 and upstream of the curved portion or bend 28. The throat 30 is therefore located at or near the leading edge of the diffuser system, at a geometric minimum pipe area opening located at the upstream end of the diffuser passage 29 defined through each diffuser pipe 20.

The precise location of the throat 30 within the first portion 24 can be determined using the measured flow characteristics of the fluid flow F within the diffuser pipe 20, or can correspond to a part of the diffuser pipe 20 (downstream of a given inlet region after the pipe inlet 23) having the smallest cross-sectional area. In the former case, the throat 30 is referred to as the "aerodynamic throat", and in the latter case, the throat 30 is referred to as the "geometric throat". In many cases, the aerodynamic throat will occur at the geometric throat, although it is possible that the aerodynamic throat is located further upstream or downstream from the geometric throat. The exact location of the aerodynamic throat 30 of the diffuser pipe 20 within the first portion 24 can vary depending on numerous factors such as the flow conditions of the fluid flow F in the diffuser pipe 20, the geometry of the diffuser pipe 20, and the flow conditions upstream and/or downstream of the diffuser pipe 20. However, the geometric throat is necessarily fixed in location, being defined as the location within the diffuser pipe 20 where the internal diffuser passage 29 has the smallest cross-sectional area. The term "throat" 30 as used herein with respect to the diffuser pipes 20 is understood to mean this geometric throat, wherein the cross-sectional area of the internal diffuser passage 29 is the smallest, between the inlet 23 and the outlet 25 of the diffuser pipe 20.

Figure 4:
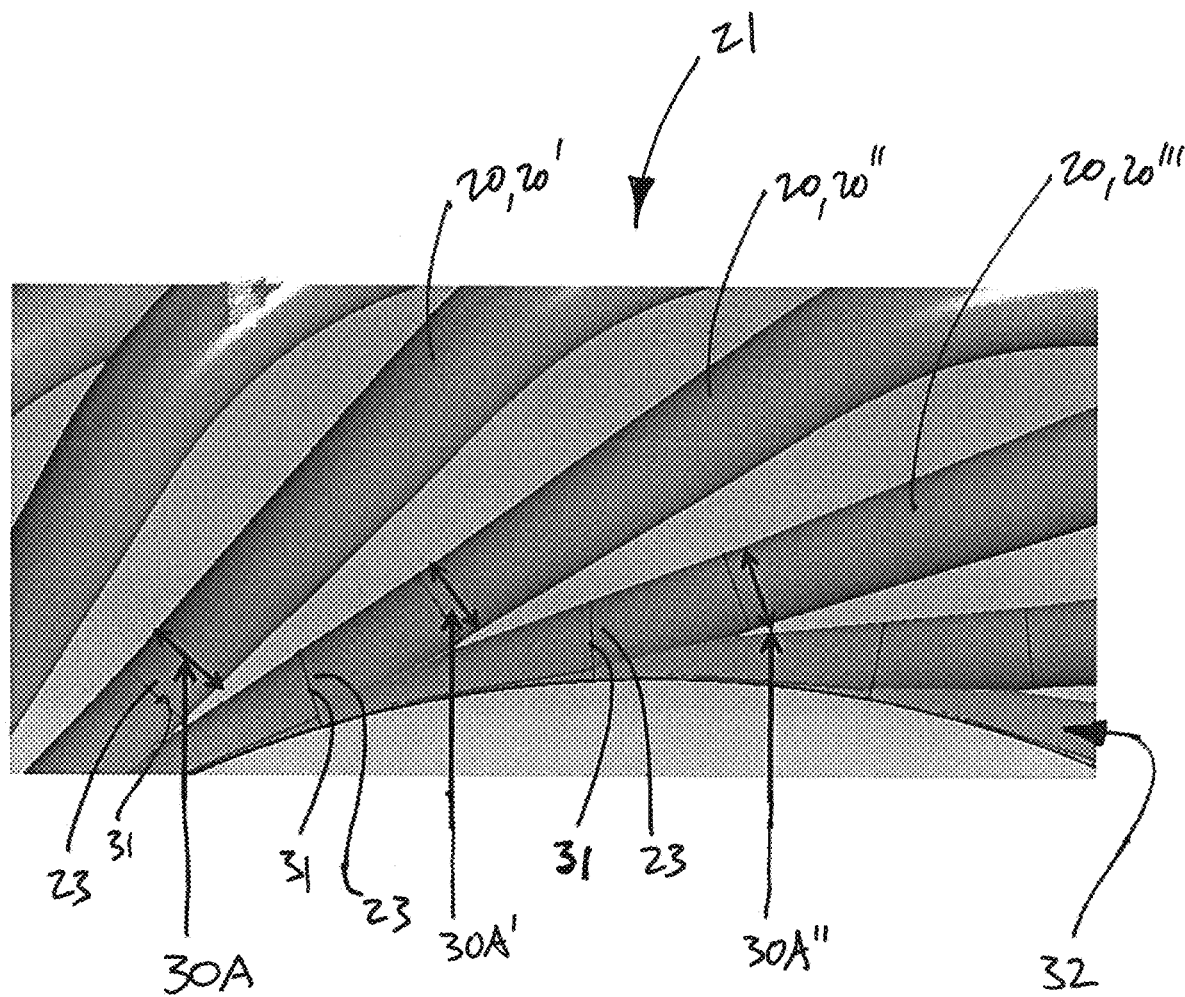
FIG. 4 is a partial axial front view of the diffuser of the centrifugal compressor of FIG. 2. DETAILED DESCRIPTION

Referring now to FIG. 4, the diffuser 21 includes an annular diffuser case 30 to which the individual diffuser pipes 20 are mounted. The diffuser case 32 is disposed at the exit of the impeller 17 of the centrifugal compressor 19, and defines a circumferential inlet space therein surrounding a periphery of the exit of the impeller 17. In one particular embodiment, the diffuser case 32 is integrally formed as a single part, and the diffuser pipes 20 are attached thereto. A series of angled passages may be defined within the diffuser case 32, each extending at least partially radially outward from the common circumferential inlet space to a corresponding individual exit 31. The diffuser case exits 31 being circumferentially spaced apart about the diffuser case 32, and each being connected in fluid flow communication with the inlet end 23 of a corresponding diffuser pipe 20. These internal passages within the diffuser case 32 may be tangential, i.e. each oriented such that its central axis coincides with a tangent to the periphery of the exit of the impeller 17 or to a circle concentric therewith.

It is to be understood that the throats 30 referred to above may also be disposed near or within the diffuser case 32, for example near a junction between the diffuser case 32 and the inlet 23 of the diffuser pipes 20. Accordingly, with the throats 30 will generally be described herein in the context of them being disposed within the diffuser pipes 20, it is to be understood that depending on the specific configuration of the diffuser assembly they may in fact be located either within the diffuser case 32 and/or at a junction between the diffuser case 32 and the diffuser pipes 20.

As noted above, each of the throats 30 may be disposed a within the upstream first portion 24 of the diffuser pipes 20 near the pipe inlet 23 thereof. However, unlike most previous diffuser designs, the diffuser pipes 20 of the diffuser 21 are not all identical to each other in flow passage size. More specifically, the size of the first portion 24 of the diffuser pipes 20 are not uniform about the diffuser pipe array, and more particularly, the respective throats 30 of the diffuser pipes 20 are not all uniform (i.e. they are "non-uniform" or "variable" in area. The diffuser 21 therefore includes two or more different diffuser pipes 20', 20", etc., each having a throat 30 with a different throat area. Accordingly, two or more different subsets of diffuser pipes (such as a first subset of diffuser pipes 20' and at least a second subset of diffuser pipes 20") may be provided, with each subset including one or more individual diffuser pipes 20' and 20", respectively, having different throat areas 30A.

The term "throat area" as used herein is understood to mean the cross-sectional area of the internal passage 29 of the pipes 20, at the throat 30 thereof (i.e. where the cross-sectional area is smallest within each pipe). Of course, this area difference at the throat 30 could alternately be expressed in terms of difference diameter of the respective pipes, which will result in corresponding difference in flow passage area.

The throat areas 30A of the diffuser passages 29 forming the diffuser assembly 21 (i.e. the diffuser array) of the present disclosure are therefore said to be non-uniform or variable about the diffuser pipe array or vane diffuser. Accordingly, the diffuser 21 includes at least two different throat areas 30A, 30A' within respective diffuser passages 29 of the different diffuser pipes 20', 20".

In FIG. 4, three different diffuser pipes 20', 20" and 20'" are depicted, each having a different throat area 30A, 30A' and 30A", respectively. However, it is to be understood that the diffuser 21 may include only two different diffuser pipes, each having a distinct throat area. Alternately, every single one of the diffuser pipes may have a unique throat area. Regardless of the specific configuration, the throat area of the diffuser pipes 20 of the present diffuser 21 is non-constant throughout the entire diffuser pipe array. Stated differently, not all diffuser passages 29 within the diffuser pipes 20 of the diffuser assembly 21 have the same throat area.

The different throat areas 30A, 30A', 30A" of the diffuser pipes 20', 20", 20'", respectively, can be distributed about the diffuser pipe array in any desired manner, including in repeating patterns, groups of similarly sized pipes, alternating, etc. For example, the diffuser pipes may alternate about the circumference of the array such that the diffuser pipe throat areas alternate consecutively (e.g. 30A, 30A', 30A, 30A', etc. or 30A, 30A', 30A", 30A, 30A', 30A", etc.). Similarly, groups of a similarly sized throat areas can also circumferentially alternate (e.g. 30A, 30A, 30A', 30A', 30A, 30A, 30A', 30A', etc.). The array of diffuser pipes may also include diffuser pipes of a first and second (or more) subsets of pipes which are disposed in any one of a symmetric, non-symmetric, circumferentially alternating or circumferentially random manner around the compressor 19. In one embodiment, two subsets (a first and a second) of diffuser pipes are provided, each composed of an equal number of diffuser pipes, wherein the diffuser pipes of the first subset have a first throat area and the diffuser pipes of the second subset have a second throat area.

Other configurations are contemplated without departing from the scope of the present disclosure. The circumferential distribution of the different types of diffuser pipes 20, and thus of the different throat areas 30A, may be selected by the design to best suit and/or conform to expected flow conditions in the compressor 19, characteristics of the engine 10, required performance criteria, and the like. Each diffuser passage 29 of the diffuser pipe 20 could therefore potentially have a different throat area, or alternately groups of diffuser passages may have different throat areas relative to other groups. Any number of different throat area configurations of the diffuser pipes 20 are therefore possible, both axis-symmetric and non-symmetric about the circumference of the diffuser case 32.

Regardless of the configuration, the pipe diffuser assembly 21 of the centrifugal compressor 19 is such that not all diffuser passages within the pipes 20 thereof have the same throat area, thereby ensuring that more than one throat area exists within the same diffuser pipe array 21.

It is to be understood that while the cross-sectional areas of the throats 30 of the diffuser pipes 20 may differ about the diffuser pipe array 21, each diffuser pipe 20 may have a common shape (and/or cross-sectional profile) at the throat 30 thereof. Alternately, however, the passages 29 may have different cross-sectional shapes or profiles at their throats 30.

The different sized throat areas 30A, 30A', etc. as described herein are understood to be sufficiently different from each other such as to cause a noticeable aerodynamic effect. Accordingly, the difference in area between two throat areas 30A and 30A', for example, is necessarily more than differences which could be caused by reasonable machining tolerances between two otherwise identical diffuser pipes 20. Those skilled in the art will appreciate that reasonable machining tolerances exist, and thus that identically sized diffuser pipes such as those employed in prior art diffuser assemblies may in fact have small differences there between due to machining tolerances. The differently sized throat areas 30A, 30A', etc. of the diffuser pipes 20', 20", etc. as described herein therefore differ in size an amount greater than such reasonable machining tolerances as understood in the art. As an example, typical manufacturing tolerances for a reaming process for diameters less than 5" (which is common for most diffuser pipes and/or diffuser passages) may be ±0.0003" to ±0.005".

Therefore, the minimum difference between a first throat area 30A of a first diffuser pipe 20' and a second throat area 30A' of a second diffuser pipe 20" of the present diffuser 21 is at least greater than this tolerance range (i.e. greater than from ±0.0003" to ±0.005")). In one particular embodiment, a difference between the first throat area 30A of the first diffuser pipe 20' and the second throat area 30A' of the second diffuser pipe 20" is 1% or more (i.e. ≥1%) of the nominal diffuser pipe internal passage area. In a more particular embodiment, a difference between the first throat area 30A of the first diffuser pipe 20' and the second throat area 30A' of the second diffuser pipe 20" is 3% or more (i.e. ≥3%). Regardless of specific relative sizes/ratios between the two or more throat areas of the diffuser pipes within the diffuser array, the throat areas of each of the diffuser passages within the diffuser pipes may be selected by the designer as required in order to achieve a desired performance and surge margin, while limiting efficiency losses.

The above description is meant to be exemplary only, and one skilled in the art will recognize that changes may be made to the embodiments described without departing from the scope of the described subject matter. Other modifications which fall within the scope of the described subject matter will be apparent to those skilled in the art, in light of a review of this disclosure, and such modifications are intended to fall within the appended claims.

The invention claimed is:

1. A compressor diffuser for a gas turbine engine comprising: a plurality of diffuser pipes circumferentially distributed about a central axis and configured for diffusing a flow of compressed air, the diffuser pipes defining a plurality of diffuser passages therewithin, each of the diffuser passages including a first portion having a radial component extending from an inlet, a second portion having an axial component extending to an outlet, and a curved portion fluidly connecting the first portion and the second portion, the first portion defining a throat, the diffuser pipes including a first subset of pipes having a first subset of passages and a second subset pipes having a second subset of passages, the throats of the first subset of passages in the first subset of pipes having a first throat area that is different than a second throat area of the second subset of passages in the second subset of pipes, wherein a difference between the first throat area and the second throat area induces non-uniformity of a flow through the compressor diffuser.

2. The compressor diffuser as defined in claim 1, wherein the first subset of passages and the second subset of passages circumferentially alternate around the central axis.

3. The compressor diffuser as defined in claim 1, wherein the first subset of passages includes more than one of the diffuser passages and the second subset of passages includes a remainder of the diffuser passages.

4. The compressor diffuser as defined in claim 3, wherein diffuser passages of the first subset of passages, of the second subset of passages, and of the third subset of passages, are circumferentially disposed in a repeating pattern around the central axis.

5. The compressor diffuser as defined in claim 1, wherein the diffuser passages are divided between the first subset of passages, the second subset of passages, and a third subset of passages, the diffuser passages of the third subset of passages having a third throat area, the third throat area being different from the first and second throat areas.

6. The compressor diffuser as defined in claim 5, wherein diffuser passages of the first subset of passages, of the second subset of passages, and of the third subset of passages are circumferentially disposed randomly around the central axis.

7. The compressor diffuser as defined in claim 1, wherein the first subset of passages and the second subset of passages are composed of an equal number of the diffuser passages having the first throat area and the second throat area, respectively.

8. The compressor diffuser as defined in claim 1, wherein the first subset of passages includes more than one of the diffuser passages and the second subset of the passages includes a remainder of the diffuser passages.

9. The compressor diffuser as defined in claim 1, wherein the first and second subset of passages are symmetrically disposed relative to a vertical plane passing through the central axis.

10. The compressor diffuser as defined in claim 1, wherein the difference between the first and second throat areas is 1% or more of a nominal diffuser passage area.

11. A centrifugal compressor comprising:
an impeller rotatable about a central longitudinal axis, the impeller having a radial impeller outlet; and
a pipe diffuser deposed downstream of the impeller, the pipe diffuser configured to diffuse gas received from the radial impeller outlet, the pipe diffuser including:
a plurality of diffuser pipes, the diffuser pipes respectively defining diffuser passages therein for diffusing the flow of compressed air received form the impeller, the diffuser passages including a first portion extending away from an inlet of the diffuser passages and defining a throat therein; and
wherein the plurality of diffuser passages include at least first and second passages, the throats of the first and second passages having different cross-sectional areas wherein a difference between the cross-sectional areas of the throats induces non-uniformity of a flow through the pipe diffuser.

12. The centrifugal compressor of claim 11, wherein the diffuser passages include a second portion extending in a direction different from the first direction to an exit of the diffuser pipes, and a curved portion fluidly linking the first portion and the second portion.

13. The centrifugal compressor of claim 11, wherein the first and second diffuser passages circumferentially alternate around the central longitudinal axis.

14. The centrifugal compressor of claim 11, wherein the first and second diffuser passages are non-consecutively disposed around the central longitudinal axis.

15. The centrifugal compressor of claim 11, wherein the plurality of diffuser passages include an equal number of the first diffuser passages and of the second diffuser passages.

16. The centrifugal compressor of claim 11, wherein the plurality of diffuser passages includes third diffuser passages, the throats of the third diffuser passages having a cross-sectional area different from the throats of the first and second diffuser passages.

17. The centrifugal compressor of claim 11, wherein the first and second diffuser passages are symmetrically disposed relative to a vertical plane passing through the central longitudinal axis.

18. The centrifugal compressor of claim 11, wherein the first and second diffuser passages are circumferentially disposed randomly around the central longitudinal axis.

19. The centrifugal compressor of claim 11, wherein the throats of the first diffuser passages have a first cross-sectional area, the throats of the second diffuser passages have a second cross-sectional area different than the first cross-sectional area, and a difference between the first cross-sectional area and the second cross-sectional area is at least 1%.

* * * * *